United States Patent
Feldmeier

(10) Patent No.: US 7,600,622 B2
(45) Date of Patent: Oct. 13, 2009

(54) CLUTCH DEVICE WITH SPRAGS

(75) Inventor: Fritz Feldmeier, Nürnberg (DE)

(73) Assignee: Paul Müller GmbH & Co. KG Unternehmensbeteiligungen, Nürnberg (DE)

( * ) Notice: Subject to any disclaimer, the term of this patent is extended or adjusted under 35 U.S.C. 154(b) by 331 days.

(21) Appl. No.: 10/594,878

(22) PCT Filed: Mar. 18, 2005

(86) PCT No.: PCT/DE2005/000513

§ 371 (c)(1),
(2), (4) Date: Sep. 29, 2006

(87) PCT Pub. No.: WO2005/095813

PCT Pub. Date: Oct. 13, 2005

(65) Prior Publication Data

US 2007/0205068 A1    Sep. 6, 2007

(30) Foreign Application Priority Data

Apr. 1, 2004    (EP) .................................. 04007914

(51) Int. Cl.
*F16D 41/069*    (2006.01)
*F16D 21/04*    (2006.01)

(52) U.S. Cl. ..................... 192/43; 192/45.1; 192/48.92; 192/65

(58) Field of Classification Search ............... 192/41 A, 192/65
See application file for complete search history.

(56) References Cited

U.S. PATENT DOCUMENTS

| 1,955,879 | A | * | 4/1934 | Griswold | 192/48.92 |
| 3,078,974 | A | * | 2/1963 | Mann | 192/45.1 |
| 3,119,479 | A | * | 1/1964 | Lund | 192/223 |
| 3,426,874 | A |   | 2/1969 | Johnston, Jr. | |
| 5,109,964 | A | * | 5/1992 | Fukui et al. | 192/48.92 |

FOREIGN PATENT DOCUMENTS

| EP | 0 465 080 A |   | 1/1992 |
| GB | 692 281 A |   | 6/1953 |
| JP | 06017851 A | * | 1/1994 |

OTHER PUBLICATIONS

International Search Report.

* cited by examiner

*Primary Examiner*—Richard M. Lorence
(74) *Attorney, Agent, or Firm*—Collard & Roe, P.C.

(57) ABSTRACT

The invention relates to a coupling device for establishing a couplable connection between two rotationally mounted machine parts, particularly a first shaft and a second shaft. To this end, the second shaft comprises a coupling ring that, on the inside, has tensioning bodies, which act against each another in pairs and which are arranged so they surround the shaft.

7 Claims, 3 Drawing Sheets

CLUTCH DEVICE WITH SPRAGS

CROSS REFERENCE TO RELATED APPLICATIONS

Applicant claims priority under 35 U.S.C. §119 of European Application No. 04007914.7 filed Apr. 1, 2004. Applicant also claims priority under 35 U.S.C. §365 of PCT/DE2005/000513 filed Mar. 18, 2005. The international application under PCT article 21(2) was not published in English.

DESCRIPTION

The invention refers to a clutch device for the couplable connection of a first shaft and a second shaft.

Clutches are known in a number of embodiments, and are described in technical literature, above all in machine element textbooks and clutch- and transmission atlases.

The object of the invention is to interconnect two rotatably mounted machine parts.

The clutch according to the invention, which is effective in both rotational directions, is a cone clutch with sprags, as are known from reverse locks, and freewheel- or override clutches, and are used as coupling elements. With sprags as coupling elements, the machine parts to be coupled can be coupled steplessly to one another in any optional rotational position. The characteristic of a positive clutch can be imparted to the torque transmission, since, depending upon the cone angle, with self-locking, the clutch can be constructed torsionally fixed, up to the breakage of the sprags or their surrounding parts.

With suitable matching of the cone angle and the axial shift force, a safety clutch can also be created, which begins to slip upon the exceeding of a predetermined maximum torque.

The invention is described in more detail with reference to exemplary embodiments in the drawing figures. In the drawings:

FIG. 1a, b show sectioned views A-A of a clutch according to FIG. 2,

Figures 1A, 1B:
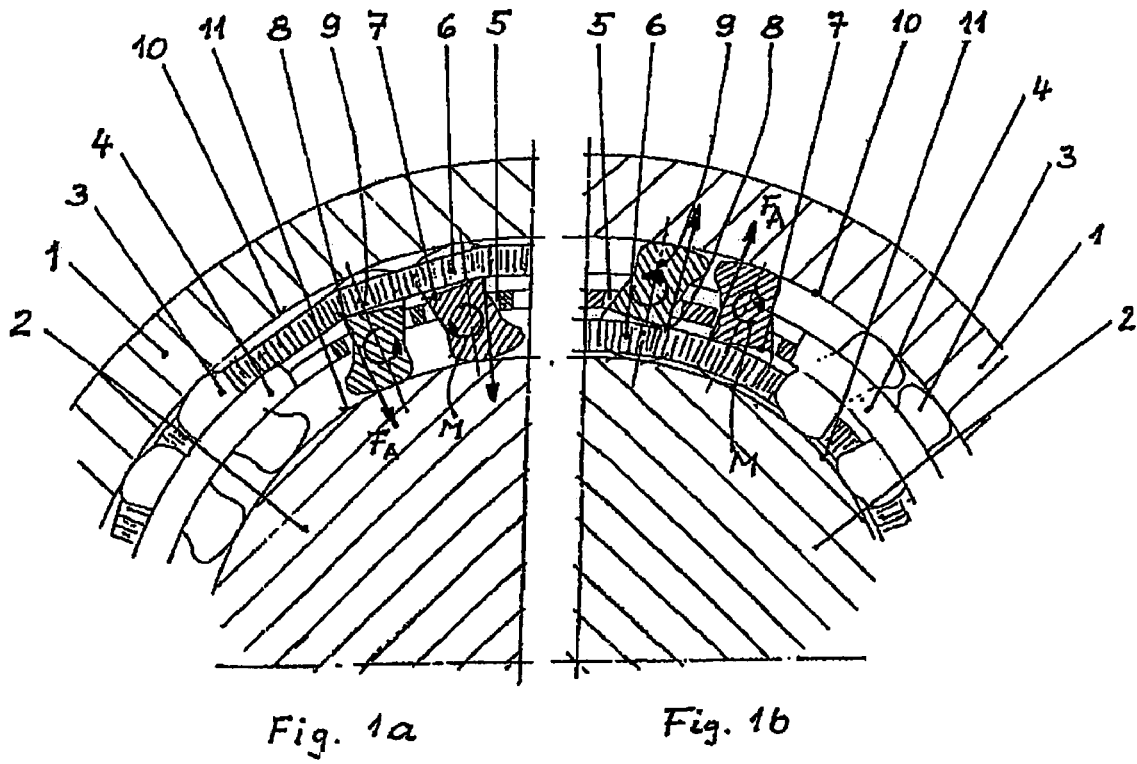
FIG. 1c shows an enlarged view of FIG. 2.

The component parts of the clutch are shown in FIG. 1. The clutch comprises the outer clutch ring 1, the shaft 2, and the sprags 3 installed radially in between, which in an encircling cage 4 which is known per se from freewheels, are retained in recesses 5, which are distributed evenly on the periphery of the cage 4, and, by a spring element 6, are in spragging readiness. The sprags 3, in the described case, have, in the middle, inclined slots 7 for the holding of the encircling spring element 6 used in this embodiment, known per se from freewheels, which is supported on the right-hand edge 8 of the slots 7, and presses radially on the sprags 3 with the adjusting force $F_A$.

The force application point for $F_A$ does not lie in the connecting lines 9, between the outer and inner contact point of the sprags 3 with the associated clamping faces 10 and 11, so that, in each case, a torque M ensues, which rolls the sprags 3 into spragging readiness. The sprags 3 are in pairs opposite one another, and are held in spragging readiness so that neither a right- nor a left-hand rotation of the clutch components 1 and 2 in relation to one another is possible.

FIG. 1a and 1b show an installed position of the sprags, rotated by 180°, and a spring element 6 with a larger diameter (FIG. 1a), and also a spring element 6 with a smaller diameter (FIG. 1b).

In FIG. 1a, with the clutch open, the sprags 3 are pressed against the clamping face 11 of the shaft 2, with this being the appropriate embodiment if the shaft 2 is in the decoupled state. In FIG. 1b, the sprags 3 are retained in the clutch ring 1, and make this embodiment universally usable.

Figure 1C:
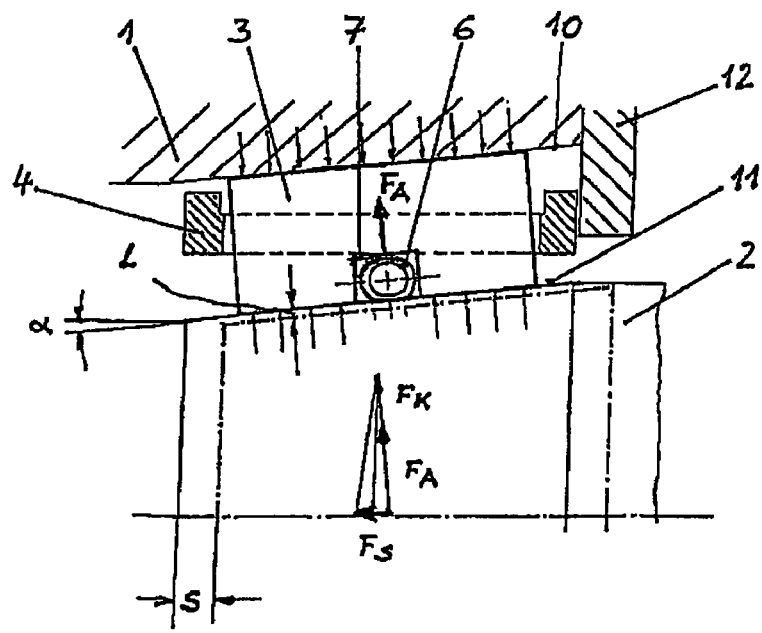

FIG. 1c shows that the clamping faces 10 and 11 are exactly parallel, and form an angle $\alpha$ of from 0 to about 10° in relation to the rotational axis. The radial spacing in the clamping faces 10 and 11 is equal to the maximum sprag height, minus the required radial roll-in travel of the inner and outer engagement curves of the sprags 3.

A stop 12 prevents the sprag cage 4 from axially sliding out. The coupling and decoupling of the two machine parts of the outer clutch ring 1 and the shaft 2, takes place by displacement axially in relation to one another by the amount s. The amount s must be large enough until the sprag engagement curve comes out of contact with one of the clamping faces 10 or 11. If L is this necessary clearance, then the amount s must be $s \geq L/\sin\alpha$. L consists of the radial roll-in travel of the sprags 3, and the desired clearance between untensioned sprags 3 and clamping face.

The selection of the cone angle $\alpha$ is of vital significance for the shift performance of the clutch. The two pieces of operating data, axial shift force and shift travel, are in a reciprocal relationship to one another. In the general application case, the clutch is designed so that the axial shift force $F_s$ is sufficient to overcome the adjusting force $F_A$ of the springs on the sprags 3, and to ensure there is a contact force $F_K$ between engagement curve and clamping faces. $F_K$ counteracts the adjusting forces $F_A$ of the two clamping faces in relation to one another, and, in the first instance, depends upon the angle $\alpha$.

The clutch, in general, is designed so that the clutch is self-locking, which is achieved with the current material pairing of steel on steel, with a coefficient of static friction of about $\mu=0.1$ and, therefore, $\tan \alpha < 0.1$, i.e. $\alpha < 7°$.

Since, in operation, the sprags mutually spread apart a little further during shock-like transmission of the rotational movement, the holding release force, with $\alpha < 7°$, must be greater than $F_s$. Angles of $\alpha \geq 7°$ are for clutches to be used with lower torques to transmit, with easy shiftability and short shift travels, but with greater shift force $F_s$.

Figure 2:
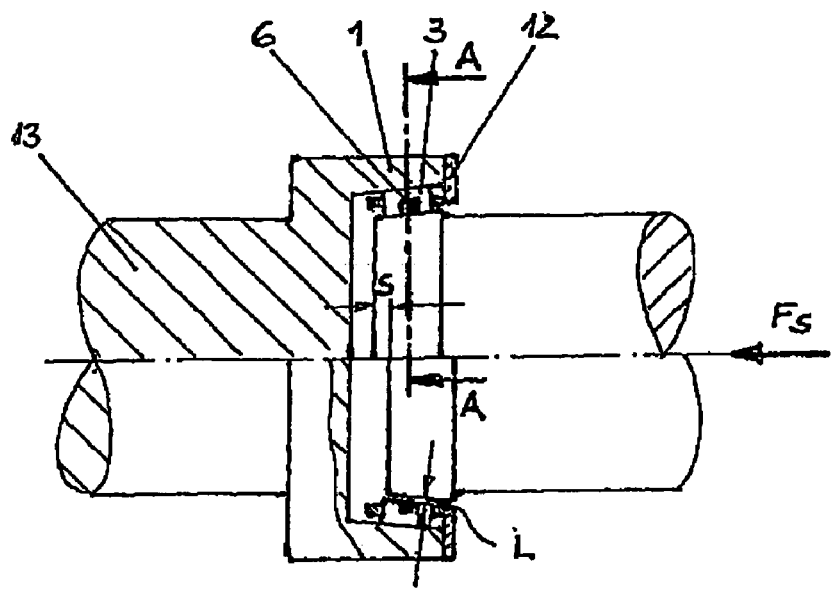
FIG. 2 shows a first embodiment of a clutch.
Figure 3:
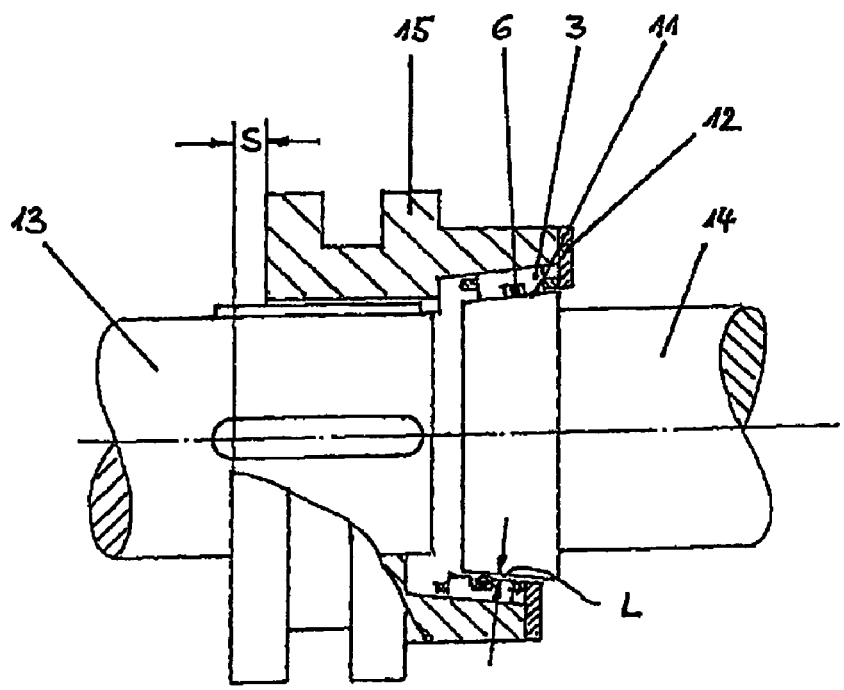
FIG. 3 shows a further embodiment of a clutch with sliding sleeve.
Figure 4:
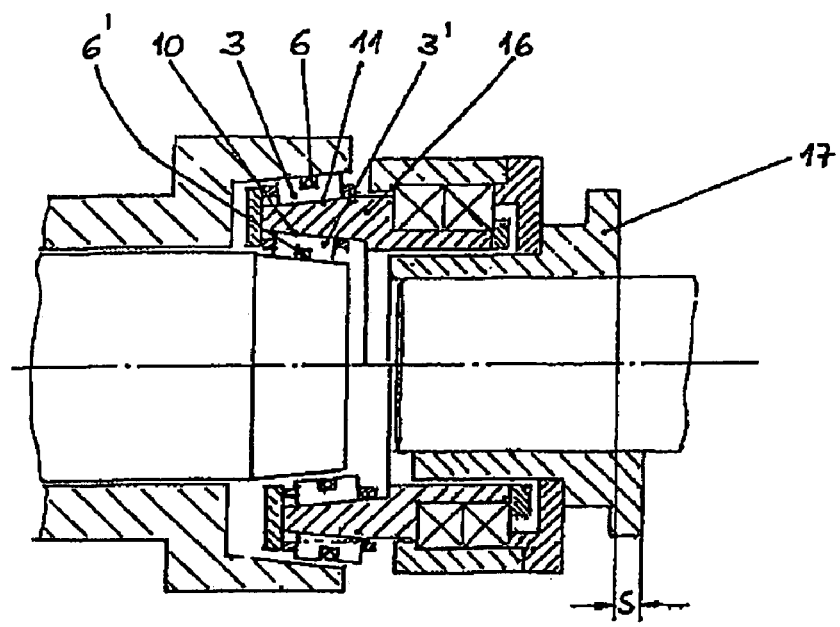
FIG. 4 shows a further embodiment of a duplex clutch with sliding sleeve.
Figure 5:
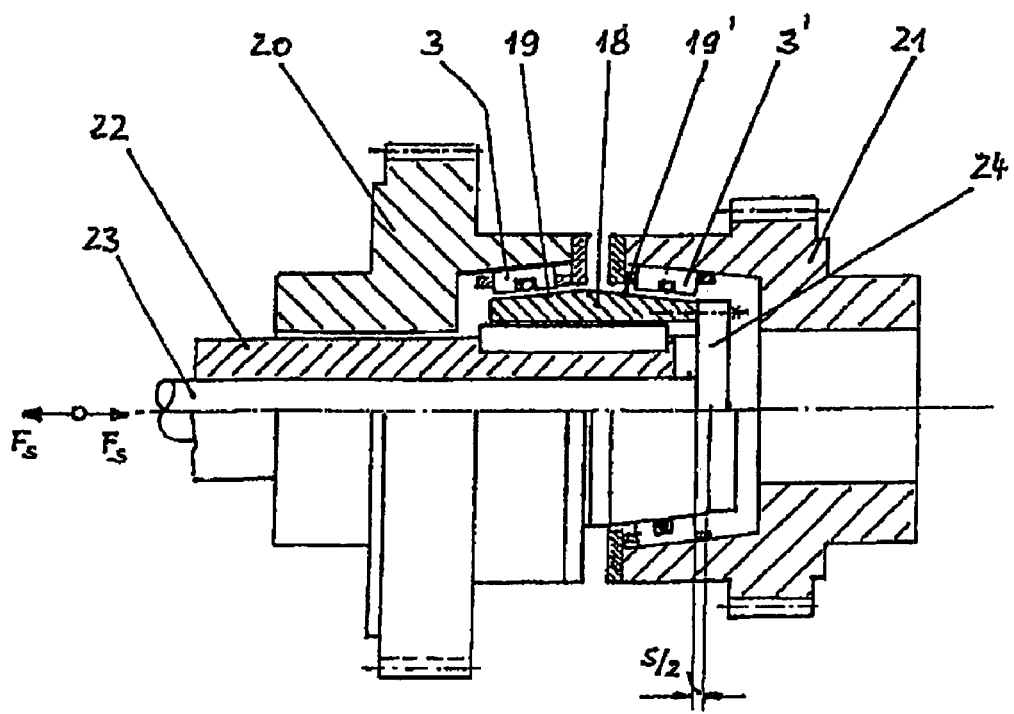
FIG. 5 shows a further embodiment of a double clutch with sliding sleeve.

In the FIGS. 2-4, the clutches show the coupled state in the upper half of the illustration, and the decoupled state in the lower half of the illustration. In FIG. 5, the clutch shows the decoupled state in the upper half of the illustration, and the coupled state in the lower half of the illustration.

The simplest embodiment of a shaft clutch is shown in FIG. 2. The sprag ring 3, with the inner-lying spring element 6, is held in the shaft 13 by the outer clutch ring, and, by the stop 12, is prevented from falling out. The shaft 13 is brought into clamping contact with the shaft 14, by the amount S, by axial telescoping, and, by this, is coupled torsionally fixed. The axial distance S is dimensioned so that the clamping contact is neutralized with the drawing apart of the two shafts 13 and 14, and a small clearance L ensues.

In FIG. 3, the two shafts 13 and 14 are immovable in relation to one another, and the coupling action is carried out by the sprags 3, by means of the sliding sleeve 15. The sliding sleeve 15 is operated externally in a known manner, and is axially movably mounted on the shaft 13 with positive locking. The other shaft 14 carries the mating clamping face 11.

The possibility of coupling two rotating machine parts by their end faces, in a small installation space, is demonstrated in FIG. 4. The sliding sleeve 16, on the clutch side, has an outer- and inner cone with the same cone angle α, and is rotatably mounted on the shift component 17, which carries out the shift travel S mechanically, hydraulically, pneumatically, or electrically operated.

The two sprag rings 3 and 3' are supported on the clamping faces 10 and 11 of the sliding sleeve 16, once by the outer spring element, and once by the inner spring element 6 and 6'. The sliding sleeve 16 does not rotate in the decoupled position (lower half of the illustration).

FIG. 5 shows the arrangement and embodiment of the clutch if two different drives 20 and 21 in a narrow space are to be steplessly and smoothly connected, in turn, to a driven shaft 22. In this case, the sliding sleeve 18, which is mounted movably but torsionally fixed, for example, in a wedge connection on the drive shaft 22, has a double cone 19, and 19', on the outside, and the driving machine parts 20 and 21 each have an inner cone, in which a sprag ring 3 and 3' is retained in each case. The sliding sleeve 18 is axially moved by a shift rod 23, exemplarily shown here, which is guided in the shaft 22, and is rigidly connected to the sliding sleeve 18 by the plate 24.

In the end positions of the shift rod 23, the corresponding drive component 20 or 21 respectively is coupled to, and driven by, the shaft 22. The shift rod 23 makes an overall axial movement of S, wherein at S/2 (middle position), the two clutch connections are disengaged, so providing the neutral position without a drive for the driving elements 20 and 21. With this, the shift rod 23 has altogether three shift positions. The shift movement can also be initiated in the sliding sleeve 18 externally, with increased spacing of the drive elements 20 and 21.

The clutch device can comprise one or more sprag rings 3, which are in a row, one behind the other, on the same inner- and outer cone (not illustrated).

LIST OF DESIGNATIONS

1 Clutch ring
2 Shaft
3 Sprag
4 Cage
5 Recess
6 Spring element
7 Slot
8 Edge
9 Connecting line
10 Clamping face
11 Clamping face
12 Stop
13 Shaft
14 Shaft
15 Sliding sleeve
16 Sliding sleeve
17 Shift component
18 Sliding sleeve
19 Double cone
20 Drive component
21 Drive component
22 Shaft
23 Shift rod
24 Plate

The invention claimed is:

1. A clutch device for the couplable connection of two rotatably mounted machine parts comprising a first shaft and a second shaft, wherein the second shaft has a clutch ring, which on the inside has sprags, acting against each other in pairs respectively, which are installed on the first shaft in an encircling manner, wherein the first shaft comprises a first clamping face and the second shaft comprises a second clamping face and wherein the first clamping face and the second clamping face are exactly parallel and form an angle α of greater than 0 degrees to about 10 degrees in relation to a rotational axis.

2. The clutch device as claimed in claim 1, wherein the sprags are accommodated in recesses of a cage.

3. The clutch device as claimed in claim 1, wherein the sprags are accommodated in a spring ring.

4. The clutch device as claimed in claim 3, wherein the spring ring is formed as a helical spring ring.

5. A clutch device for the couplable connection of two rotatably mounted machine parts comprising a first shaft with a first clamping face, a second shaft, a plurality of sprags, acting against each other in pairs, respectively, and an axially movable sliding sleeve mounted on the second shaft, said sliding sleeve having a second clamping face, wherein the first and second clamping faces are coupled together via the sprags, are exactly parallel, and form an angle α of greater than 0 degrees to about 10 degrees in relation to a rotational axis.

6. A clutch device for the couplable connection of two rotatably mounted machine parts comprising a first rotating machine part with a first face, a second rotating machine part with a second face, a plurality of sprags, acting against each other in pairs, respectively, a shift component, and an axially movable sliding sleeve mounted on the shift component, said sliding sleeve having an outer side and an inner side, wherein the first and second faces are coupled together via the sprags with the outer and inner sides of the axially movable sliding sleeve, respectively, and wherein the first face and the outer side of the axially movable sliding sleeve are exactly parallel and form an angle α of greater than 0 degrees to about 10 degrees in relation to a rotational axis.

7. A clutch device for the couplable connection of two rotatably mounted machine parts comprising a first drive with a first inner cone, a second drive with a second inner cone, a plurality of sprags, acting against each other in pairs, respectively, a drive shaft, and an axially movable sliding sleeve mounted on the drive shaft, said sliding sleeve having a double cone comprising a first cone clamping face and a second cone clamping face coupled together via the sprags with the first inner cone and the second inner cone, respectively, wherein the first cone clamping face and the first inner cone are exactly parallel and form an angle α of greater than 0 degrees to about 10 degrees in relation to a rotational axis, and wherein the second cone clamping face and the second inner cone are exactly parallel and form an angle α of greater than 0 degrees to about 10 degrees in relation to the rotational axis.

* * * * *

UNITED STATES PATENT AND TRADEMARK OFFICE
CERTIFICATE OF CORRECTION

| | | |
|---|---|---|
| PATENT NO. | : 7,600,622 B2 | Page 1 of 1 |
| APPLICATION NO. | : 10/594878 | |
| DATED | : October 13, 2009 | |
| INVENTOR(S) | : Fritz Feldmeier | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 345 days.

Signed and Sealed this

Fifth Day of October, 2010

David J. Kappos
*Director of the United States Patent and Trademark Office*